Patented Oct. 23, 1951

2,572,564

UNITED STATES PATENT OFFICE 2,572,564

PREPARATION OF ALKYL THIOCYANATES

Chester M. Himel and Lee O. Edmonds, Bartlesville, Okla., assignors to Phillips Petroleum Company, a corporation of Delaware No Drawing. Application December 21, 1948, Serial No. 66,583

10 Claims. (Cl. 260—454)

This invention relates to a process for the preparation of a thiocyanate. In one embodiment of the invention it relates to the preparation of an alkyl thiocyanate by interaction between a sulfenyl halide and an inorganic cyanide. The process of the invention can be effected by bringing together a sulfenyl halide and hydrogen or metal cyanide, or by admixing a solution of a sulfenyl halide in an organic solvent and an aqueous alkali metal hydroxide solution and adding hydrogen cyanide to the resulting mixture.

In the prior art there has been prepared a certain aryl thiocyanate, using for this purpose an aryl sulfenyl halide and potassium cyanide in the presence of glacial acetic acid solution. However, this method which has been employed in preparing aryl thiocyanates and the well-known common methods of preparing organic thiocyanates, as the interaction of alkyl halides with inorganic salts of thiocyanic acid, or of mercaptides with cyanogen halides and similar reactions, are not entirely satisfactory for the preparation of alkyl thiocyanates and involves limited availability or high cost of starting material, or rather low yields.

According to the present invention, there is provided a process which enables us to prepare an alkyl thiocyanate from an alkyl sulfenyl halide in the presence of an aqueous medium without decomposition of the sulfenyl halide, despite the fact that the alkyl sulfenyl halides are hydrolytically unstable and, in some instances, decompose with almost explosive violence when brought in contact with water.

Thus, according to this invention there is provided a process for the preparation of an alkyl thiocyanate from an alkyl sulfenyl halide which comprises contacting said halide dissolved in an organic solvent with an inorganic cyanide, such as hydrogen cyanide and alkali metal or alkaline earth metal cyanides, for a time sufficient to form said alkyl thiocyanate, or in another modification thereof, by contacting a mixture of an organic solution of alkyl sulfenyl halide and aqueous metal hydroxide solution with hydrogen cyanide. For example, ethyl thiocyanate can be prepared from ethylsulfenyl chloride and sodium cyanide in good yield and without experiencing decomposition of the ethylsulfenyl chloride.

The reaction, according to this invention, can be represented as follows:

$$RSX + MCN(aq) \rightarrow RSCN + MX$$

wherein R is an alkyl radical; M represents an inorganic radical such as hydrogen, an alkali metal or an alkaline earth metal; and X represents a halogen selected from chlorine, bromine, or iodine.

The reaction of this invention can be effected smoothly, quickly and efficiently in ordinarily available, simple apparatus and does not require the observance of any special precautions other than those usually to be followed when dealing with hydrogen cyanide, when the latter compound is employed in the modification described. For simplicity of operation and from a commercial viewpoint, the use of the aqueous solution of alkali metal hydroxide and hydrogen cyanide may have certain economic advantages. Although any of the various alkali metals may be used, it will generally be preferred to employ sodium because of its cheapness and ready availability.

The sulfenyl halides which can be used in the process of this invention as stated, are the alkyl sulfenyl chlorides, bromides and iodides. Whenever herein and in the claims "halide" appears, only the chlorides, bromides and iodides are to be understood to be included. Different alkyl sulfenyl compounds containing a varying number of carbon atoms and of varying carbon configuration may be employed in the present process which is, however, particularly adaptable to the preparation of alkyl thiocyanates of lower carbon content, such as alkyl groups containing up to and including twelve carbon atoms. These sulfenyl halides may be prepared by an interaction between mercaptans or disulfides with elemental halogen in an inert organic solvent. It is particularly efficacious to employ a solvent which is satisfactory in the present process in which the sulfenyl halide in an organic solvent is admixed with an aqueous solution of the cyanide reactant. A particularly desirable solvent both for the preparation of the sulfenyl halide and for the preparation therefrom of an alkyl thiocyanate has been found to be volatile low-boiling paraffinic hydrocarbons, such as pentanes and hexanes, and mixtures thereof. The sulfenyl halide and the cyanide are preferably used in equivalent or stoichiometric quantities.

The preparation of the thiocyanates can be effected by bringing together the reactants at a temperature within the range of about −10° C. to about +50° C. Temperatures without this range do not appear to add any special advantage. However, it will be understood that the temperatures employed may extend above or below this range, if desirable. The invention claimed resides in the discovery that an alkyl sulfenyl halide can be caused to react with alkali metal cyanide, alkaline earth metal cyanide, or hydrogen cyanide in aqueous solution to prepare the corresponding thiocyanate and the temperature to be employed in any particular case can be determined by mere routine test. However, the temperature will usually be in the recited range, a temperature in the range of 5° C. to 30° C., more particularly in the range of 15° C. to 25° C., being now preferred.

The time for the reaction to be completed will depend upon the particular sulfenyl halide and the temperature employed as well as upon other conditions which may exist, such as the total quantity of reactants present and the solvent employed. Ordinarily, with quantities of the reactants as shown in the examples below, a time of about 30 minutes to about 90 minutes will be sufficient to substantially complete the reaction after the addition of the metal cyanide or hydrogen cyanide has been accomplished.

The reaction of this invention appears to be substantially independent of the pressure and there appears to be no special advantage in the use of pressures other than the prevailing atmosphere. However, the pressure employed should be at least that required to maintain reactants in liquid phase at the operating temperature.

The reaction of this invention is advantageously effected in the presence of a solvent which is substantially inert under the conditions of the reaction. Thus, especially, in the preparation of alkyl thiocyanate, the solvent to be employed is one of an organic nature, for example a low-boiling hydrocarbon such as isopentane. As described above, it is especially advantageous to employ as solvent the medium in which the reactant sulfenyl halides are prepared. If the solvent has the boiling point of the desired reaction temperature the reaction can advantageously be effected in refluxing solvent, as a fairly constant temperature and a degree of automatic stirring can be maintained. Particularly when so operating it is expedient to employ a refluxing condenser with the reactor to condense and return solvent and, where present, hydrogen cyanide vapors. Other organic solvent which can be employed are diethyl ether, chloroform and the like.

As shown in the examples, it is now preferred to add the reactant cyanide to a mixture of the sulfenyl halide and the solvent, although it is to be understood that any other order of admixture or bringing together of the reactants can be employed.

*Example I*

A reactor was charged with 73.5 grams of sodium cyanide in a 20 per cent aqueous solution. To this solution was added 144 grams of ethylsulfenyl chloride dissolved in isopentane. The mixture was stirred for 45 minutes, at a temperature of about 20° C. The reaction mixture was then washed with water, dried, and fractionated under reduced pressure. A yield of 80 grams of ethyl thiocyanate, having a boiling point of 145° C. and an index of refraction of 1.4653, was obtained.

*Example II*

A solution of 186 grams of tert-butylsulfenyl chloride in isopentane was charged to a reaction vessel. 250 ml. of 20% sodium hydroxide was added and then to the resulting mixture was slowly added 40 grams of hydrogen cyanide. The sodium hydroxide absorbed the hydrogen chloride evolved in the reaction between the tert-butylsulfenyl chloride and the hydrogen cyanide. The reaction mass was stirred during the addition and for 45 minutes thereafter. The reaction product was then separated to remove the aqueous layer, and then washed and dried. The isopentane was then removed by distillation and the product fractionated under reduced pressure. A yield of 126 grams (73 per cent) of distilled tert-butylthiocyanate, B. P. 53° C. at 21 mm., $n_D^{20}$ 1.4542, was obtained.

It is to be understood that reasonable variations and modifications are permissible within the scope of the appended claims to the invention, the essence of which is that alkyl sulfenyl halides and aqueous solutions of cyanide can be reacted to form the corresponding thiocyanates readily, economically and in good yield.

We claim:

1. A process for the preparation of an alkyl thiocyanate which comprises contacting an alkyl sulfenyl halide selected from the group consisting of alkyl sulfenyl chlorides, alkyl sulfenyl bromides and alkyl sulfenyl iodides dissolved in an inert organic solvent with an aqueous solution of an inorganic cyanide selected from the group consisting of hydrogen cyanide, alkali metal cyanides and alkaline-earth metal cyanides for a time sufficient to form said thiocyanate, and recovering alkyl thiocyanate from the resulting reaction mixture.

2. A process for the preparation of an alkyl thiocyanate which comprises contacting an alkyl sulfenyl halide selected from the group consisting of alkyl sulfenyl chlorides, alkyl sulfenyl bromides and alkyl sulfenyl iodides dissolved in an inert organic solvent with an aqueous solution of an inorganic cyanide selected from the group consisting of hydrogen cyanide, alkali metal cyanides and alkaline-earth metal cyanides at a temperature between —10° C. and +50° C. for a time sufficient to form said thiocyanate, and recovering alkyl thiocyanate from the resulting reaction mixture.

3. A process according to claim 2 wherein said alkyl sulfenyl halide is selected from the group consisting of sulfenyl halides having an alkyl radical containing between one and twelve carbon atoms.

4. A process for the preparation of an alkyl thiocyanate which comprises contacting an alkyl sulfenyl halide selected from the group consisting of alkyl sulfenyl chlorides, alkyl sulfenyl bromides and alkyl sulfenyl iodides dissolved in an inert low-boiling hydrocarbon solvent with an aqueous solution of hydrogen cyanide at a temperature between —10° C. and +50° C. for a time sufficient to form said thiocyanate, and recovering alkyl thiocyanate from the resulting reaction mixture.

5. A process for the preparation of an alkyl thiocyanate which comprises contacting an alkyl sulfenyl halide selected from the group consisting of alkyl sulfenyl chlorides, alkyl sulfenyl bromides and alkyl sulfenyl iodides dissolved in an inert low-boiling hydrocarbon solvent with an aqueous solution of an alkali metal cyanide at a temperature between —10° C. and +50° C. for a time sufficient to form said thiocyanate, and recovering alkyl thiocyanate from the resulting reaction mixture.

6. A process according to claim 5 in which said alkyl sulfenyl halide is ethylsulfenyl chloride, said solvent is isopentane, and said alkali metal cyanide is sodium cyanide.

7. A process for the preparation of an alkyl thiocyanate which comprises admixing an alkyl sulfenyl halide selected from the group consisting of alkyl sulfenyl chlorides, alkyl sulfenyl bromides and alkyl sulfenyl iodides with a low-boiling hydrocarbon and an aqueous solution of an alkali metal hydroxide, adding hydrogen cyanide to a resulting mixture, and maintaining a temperature between −10° C. and +50° C. for a time sufficient to form said thiocyanate, and recovering alkyl thiocyanate from the resulting reaction mixture.

8. A process according to claim 7 in which said alkyl sulfenyl halide is tert-butylsulfenyl chloride, said hydrocarbon is isopentane, and said alkali metal hydroxide is sodium hydroxide.

9. A process according to claim 5 in which said alkyl sulfenyl halide is tert-butylsulfenyl chloride and said alkali metal cyanide is sodium cyanide.

10. A process for the preparation of an alkyl thiocyanate which comprises, mixing together an aqueous solution of an inorganic cyanide selected from the group consisting of hydrogen cyanide, alkali metal cyanides and alkaline-earth metal cyanides and a solution of an alkyl sulfenyl halide selected from the group consisting of alkyl sulfenyl chlorides, alkyl sulfenyl bromides and alkyl sulfenyl iodides dissolved in a low-boiling hydrocarbon solvent which is inert to said inorganic cyanide and said alkyl sulfenyl halide, reacting said inorganic cyanide and said alkyl sulfenyl halide at a temperature of from 5° C. to 30° C. to produce said alkyl thiocyanate, and recovering said alkyl thiocyanate from a resulting reaction mixture as a product of the process.

CHESTER M. HIMEL.
LEE O. EDMONDS.

REFERENCES CITED

The following references are of record in the file of this patent:

Gilman: Organic Chemistry, vol. I (2nd, 1943), pp. 920–923.

Zincke et al.: Berichte, vol. 51, pp. 755 and 767 of article running from 751 to 767 (1918).